United States Patent
Aadnøy

(10) Patent No.: US 10,233,723 B2
(45) Date of Patent: Mar. 19, 2019

(54) AUTONOMOUS WELL VALVE

(71) Applicant: Bernt Sigve Aadnøy, Sandnes (NO)

(72) Inventor: Bernt Sigve Aadnøy, Sandnes (NO)

( * ) Notice: Subject to any disclaimer, the term of this patent is extended or adjusted under 35 U.S.C. 154(b) by 164 days.

(21) Appl. No.: 15/377,478

(22) PCT Filed: Jun. 24, 2015

(86) PCT No.: PCT/NO2015/000016
§ 371 (c)(1),
(2) Date: Dec. 13, 2016

(87) PCT Pub. No.: WO2015/199545
PCT Pub. Date: Dec. 30, 2015

(65) Prior Publication Data
US 2017/0260829 A1   Sep. 14, 2017

(30) Foreign Application Priority Data

Jun. 25, 2014   (NO) .................................... 20140812

(51) Int. Cl.
| | |
|---|---|
| *E21B 43/12* | (2006.01) |
| *F16K 33/00* | (2006.01) |
| *F16K 31/18* | (2006.01) |
| *E21B 34/06* | (2006.01) |
| *E21B 34/08* | (2006.01) |

(52) U.S. Cl.
CPC ............... *E21B 34/06* (2013.01); *E21B 34/08* (2013.01); *E21B 43/12* (2013.01); *F16K 31/18* (2013.01); *F16K 33/00* (2013.01)

(58) Field of Classification Search
CPC .......... E21B 34/06; E21B 34/08; E21B 43/12; F16K 31/18; F16K 31/20; F16K 31/30; F16K 33/00
See application file for complete search history.

(56) References Cited

U.S. PATENT DOCUMENTS

| | | | | |
|---|---|---|---|---|
| 2,204,340 A | * | 6/1940 | Bradshaw | ............... E21B 21/10 |
| | | | | 137/515.5 |
| 3,363,642 A | * | 1/1968 | Grayson | ................. C02F 1/686 |
| | | | | 137/399 |
| 3,408,949 A | * | 11/1968 | Hart, Jr. | ................... E21B 43/38 |
| | | | | 417/126 |

(Continued)

FOREIGN PATENT DOCUMENTS

| | | |
|---|---|---|
| WO | 2013070235 | 5/2013 |
| WO | 2014081306 | 5/2014 |
| WO | 2015009314 | 1/2015 |

OTHER PUBLICATIONS

International Search Report, PCT/NO2015/000016, dated Aug. 17, 2015.

(Continued)

*Primary Examiner* — Reinaldo Sanchez-Medina
*Assistant Examiner* — David Colon-Morales
(74) *Attorney, Agent, or Firm* — Andrus Intellectual Property Law, LLP

(57) ABSTRACT

An autonomous well valve having a body that constitutes an actuator for opening and closing at least one first valve opening, wherein the body, that in operation is submerged, has an effective density that is equal or greater than the density of a first fluid and less than the density of a second fluid.

5 Claims, 5 Drawing Sheets

(56) References Cited

U.S. PATENT DOCUMENTS

| | | | | |
|---|---|---|---|---|
| 4,687,019 | A * | 8/1987 | Mayfield | E21B 21/10 137/375 |
| 4,990,233 | A * | 2/1991 | Hahn | C23C 14/083 427/529 |
| 5,044,397 | A | 9/1991 | Szlaga | |
| 5,813,432 | A | 9/1998 | Elsdon et al. | |
| 7,185,706 | B2 * | 3/2007 | Freyer | E21B 43/08 166/265 |
| 7,409,999 | B2 * | 8/2008 | Henriksen | E21B 34/08 166/330 |
| 7,614,420 | B2 * | 11/2009 | Rustad | F16K 31/20 137/423 |
| 7,762,341 | B2 * | 7/2010 | Hammer | E21B 34/08 166/187 |
| 7,775,284 | B2 * | 8/2010 | Richards | E21B 43/086 166/227 |
| 7,828,067 | B2 * | 11/2010 | Scott | E21B 43/12 166/386 |
| 7,857,061 | B2 * | 12/2010 | Richards | E21B 34/063 166/317 |
| 8,474,535 | B2 * | 7/2013 | Richards | E21B 34/06 166/227 |
| 8,607,873 | B2 * | 12/2013 | Aadnoy | E21B 34/08 166/320 |
| 8,616,290 | B2 * | 12/2013 | Dykstra | E21B 43/12 166/250.15 |
| 8,833,466 | B2 * | 9/2014 | Zhou | E21B 34/08 166/319 |
| 8,839,849 | B2 * | 9/2014 | Guest | E21B 33/124 166/319 |
| 9,284,794 | B2 * | 3/2016 | Dale | E21B 17/18 |
| 9,353,608 | B2 * | 5/2016 | Johannessen | E21B 33/1208 |
| 9,404,351 | B2 * | 8/2016 | Noui-Mehidi | E21B 43/086 |
| 9,453,395 | B2 * | 9/2016 | Fripp | E21B 34/08 |
| 9,840,889 | B2 * | 12/2017 | Killie | E21B 34/08 |
| 9,988,875 | B2 * | 6/2018 | Van Dam | E21B 34/08 |
| 2008/0041580 | A1 | 2/2008 | Freyer | |
| 2008/0041581 | A1 | 2/2008 | Richards | |
| 2008/0041582 | A1 * | 2/2008 | Saetre | E21B 34/08 166/205 |
| 2008/0283238 | A1 * | 11/2008 | Richards | E21B 23/04 166/228 |
| 2011/0073308 | A1 * | 3/2011 | Assal | E21B 43/08 166/278 |
| 2012/0061088 | A1 * | 3/2012 | Dykstra | E21B 34/08 166/318 |
| 2013/0068467 | A1 | 3/2013 | Zhou | |
| 2015/0021019 | A1 * | 1/2015 | Veit | E21B 34/08 166/250.15 |

OTHER PUBLICATIONS

Written Opinion, PCT/NO2015/000016, dated Aug. 17, 2015.
Norwegian Search Report, Norwegian Patent Application No. 20140812, dated Jan. 19, 2015.

* cited by examiner

VII-VII

AUTONOMOUS WELL VALVE

FIELD

There is provided an autonomous well valve. More precisely there is provided an autonomous well valve having a buoyant body that constitutes an actuator for opening and closing at least one first valve opening.

BACKGROUND

When producing from, injecting into or maintaining a downhole well, a need for opening or closing flow as well as directing fluids of different densities arises.

WO 2013/070235 discloses an apparatus for autonomously controlling fluid flow in a subterranean well, the fluid having a density which changes over time. An embodiment of the apparatus has a vortex chamber, a vortex outlet, and first and second inlets into the vortex chamber. Flow into the inlets is directed by a fluid control system which has a control passageway for directing fluid flow as it exits a primary passageway. A movable fluid diverter positioned in the control passageway moves in response to change in fluid density to restrict fluid flow through the control passageway. When fluid flow through the control passageway is unrestricted, fluid from the control passageway directs fluid exiting the primary passageway toward a selected vortex inlet. When flow through the control passageway is unrestricted, flow from the primary passageway is directed into the other vortex inlet.

US 2008/041580 shows an autonomous flow restrictors for use in a subterranean well. An apparatus is disclosed for use in a well wherein both oil and gas are produced. The apparatus includes multiple flow blocking members having a density less than that of the oil. The members are positioned within a chamber with the members increasingly restricting a flow of the gas out of the chamber through multiple outlets. Another apparatus is disclosed for restricting production of at least one undesired fluid which has a density different from a density of a desired fluid. The apparatus includes at least one flow restrictor and at least one bypass flow restrictor. The bypass restrictor may have a greater restriction to flow therethrough as compared to the other flow restrictor. The apparatus further includes multiple flow blocking members operative to increasingly restrict flow of the undesired fluid through the flow restrictor in response to an increased proportion of the undesired fluid.

WO 2014/081306 discloses an apparatus and a method for controlling fluid flow in or into a well, wherein the apparatus comprising: at least one housing having: an inlet; and at least one outlet, one of which is arranged in a top portion or a bottom portion of the housing when in a position of use; and a flow control means disposed within the housing, the flow control means having a density being higher or lower than a density of a fluid to be controlled, and a form adapted to substantially block the outlet of the housing when the flow control means is in a position abutting the outlet.

US 2013/068467 discloses an inflow control device that controls the rate of fluid flow from a subsurface fluid reservoir into a production tubing string. The inflow control device includes a particulate screen to remove particulate matter from the reservoir fluid, and at least two flow restrictors. The flow restrictors are positioned on circumferentially opposite sides of the inflow control device and are connected by an isolated fluid passage. The flow restrictors limit the flowrate of reservoir fluid when the reservoir fluid has a high water or gas-to-oil ratio. The inflow control device also includes at least one pressure drop device that generates a pressure drop for the reservoir fluid in response to fluid pressure in the reservoir. The inflow control device also includes a choking apparatus that allows the flow of reservoir fluid to be shut off and the particulate screen cleaned while the inflow control device is in place in hole.

SUMMARY

Generally, it is advantageous to open and close, alternatively redirect flow, in or close to the well itself. Lack of reliable valves suited for such operations, combined with difficulty related to the operation of them, has made such solutions less viable. A result is for instance, that vast quantities of water is produced to the surface from petroleum wells.

The purpose of the invention is to overcome or reduce at least one of the disadvantages of the prior art.

The purpose is achieved according to the invention by the features as disclosed in the description below.

There is provided an autonomous well valve having a body that constitutes an actuator for opening and closing at least one first valve opening, and where the body, that in operation is submerged, has an effective density that is equal or greater than the density of a first fluid and less than the density of a second fluid, wherein the first valve opening extends from a conical recess in the first member, and where a first end portion of the body has a corresponding conical recess, and where a ball is placed between said two recesses, and where conical recesses with a ball in between are provided at a second end portion of the body and in the second member, and where the body has a length that gives room for some axial movement between the first and second members, and where a ball race with at least one race ball surrounds the body.

The term "effective density" equals the weight/volume ratio of the body. The body may be hollow and be made from materials of different densities.

Typically, the first fluid is a fluid having a lower density than the second fluid. The first fluid may be a fluid having lower density than water, and the second fluid may be water, or the first fluid may be water and the second fluid may be a fluid having higher density than water.

The body is positioned between the first member and the second member where the first member has the first valve opening with a valve closer, and where the second member has a body support that is inclined relative a valve center axis.

When the fluid surrounding the body is changed from the first fluid to the second fluid, the body will rise in the fluid and move along the inclined body support of the second member due to direct or indirect contact with the inclined body support. The body is thus also moved somewhat along the center axis and thus actuating the valve closer to close the first valve opening.

When the fluid is changed from the second fluid to the first fluid, the operation will be reversed relatively the above.

A valve closer in the form of a ball constitutes a simple and reliable item both for the closing operation and for movement between the first member and the body.

The conical recess in the second member may extend into a second valve opening.

Both end portions of the body and the corresponding first and second members may thus have an identical form.

The body may be biased towards the second member when the body is in its sunken position. The first valve opening is thus kept open when the body is in a lower location and closed when the body is in its upper location. An example of biasing elements is race balls that support the body and that is designed to position themselves at their lowest position due to gravity.

In an oil producing well, the valve may be used for shutting off production if water enters the tool, and may be used for rerouting the water to a different formation. If water disappears and oil again enters the valve, oil production will resume. The same functionality may be used for gas production where gas stops and/or is rerouted to another formation. The tool may be used in a gas well for reducing water production.

In injection wells, the valve may be used to control zonal flow by varying the density of the injected fluids. The valve may be installed at selected places in the well and the direction of flow is opposite of the flow when the valve is used for instance as a waterstop valve. If a light fluid is injected, the valve is open and allow fluid to pass into the formation. For instance, if water or a heavier fluid is injected the valve will close. Many types of fluids may be used for injection purposes such as glycol water, methanol, various inhibitors, acids, gasses such as $CO_2$ and other fluids. The valve may be designed to allow flow of heavier or lighter fluids. Typical operations where this will be advantageous is various workover operations.

The valve may be symmetrical about the center axis. The valve may then be functional in any rotational position. The actual design may render the valve to be operational in substantially any direction.

Such a design lend itself to be used blindly, which is without any specific orientation of the valve in the well.

The mechanism may also be used for other applications that require dedicated production/injection points such as water and gas injection (WAG) and steam assisted gravity drainage (SAGD), and workover and well stimulation and operations where fluids of different densities are pumped into the well.

More than one valve may be positioned in series in a flow path. The different valves may operate at different fluid densities.

Thus, the valve according to the invention includes a mechanism that is actuated by a buoyant force that open or close one or several valves. Uses of the valve includes shutting off unwanted water or gas production, potentially rerouting these to a reservoir at another depth. Other uses are workover, stimulation or well intervention operations where fluids of selected densities can be placed in specific places in the well. Other uses of the valve can be well operations where specific tools may be actuated by pumping fluids of different densities. The mechanism is also useful for injection wells, where for example alternate water and gas injection are placed in different formations in the reservoir.

As outlined above, the mechanism is autonomous, acting on variations in fluid densities. The mechanism has a high degree of symmetry resulting in that it can be installed blindly. This means that the mechanism need no orientation during installation in a well, and the mechanism works for all wellbore inclinations from vertical to horizontal. The mechanism may be installed as a single unit or as multiple units spaced throughout the well.

The valve according to the invention provides a reliable, simple and cost effective way of autonomous flow control in a downhole well.

BRIEF DESCRIPTION OF THE DRAWINGS

Below, an example of a preferred device is explained under reference to the enclosed drawings, where.

DETAILED DESCRIPTION OF THE DRAWINGS

Figure 1:
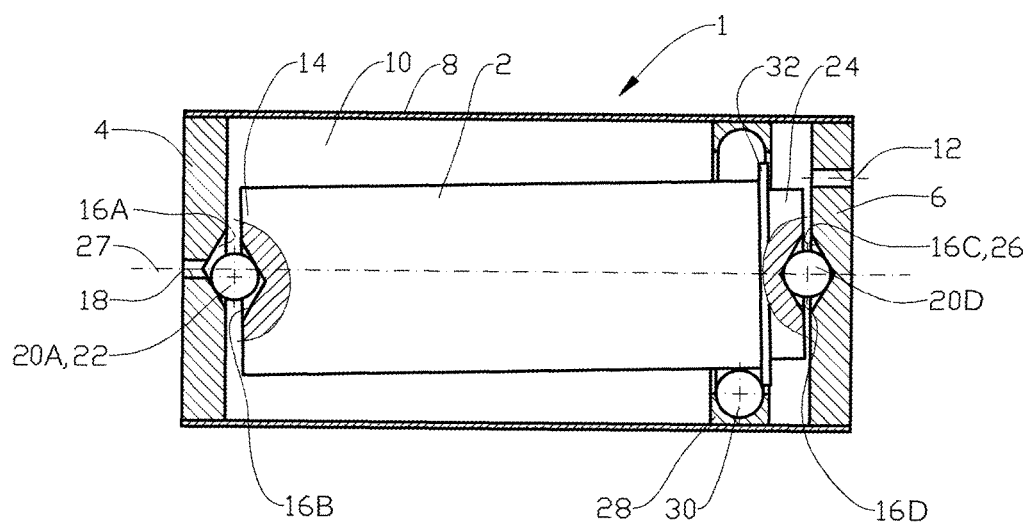
FIG. 1 shows a principal sketch in cross section a valve according to the invention in its open position.

On the drawings, the reference number 1 denotes a well valve that includes a body 2 that in operation is submerged. The body 2 is positioned between a first member 4 and a second member 6 in a housing 8. In this preferred embodiment the members 4, 6 and housing 8 provides a room 10 for the body 2. Fluid may enter the room 10 via an opening 12.

At its first end portion 14 that is closest to the first member 4, the body 2 is provided with a central conical recess 16B. Similarly, the first member 4 is provided with a conical recess 16A opposing the conical recess 16B of the first end portion 14. A first valve opening 18 extends from the conical recess 16A of the first member 4.

A ball 20A that here constitutes a valve closer 22, is positioned between the said conical recesses 16A, 16B.

Similarly, conical recesses 16C, 16D with a ball 20D in between are provided at a second end portion 24 of the body 2 and in the second member 6. The conical recess 16C in the second member 6 constitute a body support 26.

The length of the body 2 is chosen to give room for some axial movement between the first and second members 4, 6. The valve 1 is symmetrical about its central axis 27.

A ball race 28 with at least one race ball 30 surrounds the body 2. The ball race 28 is fixed to the housing 8. Gravity will ensure that the at least one race ball 30 is positioned at its lowermost position in the ball race 28.

A flange like ring 32 on the body 2 abuts the race ball 30 and bias the body 2 towards the second member 6 and the body support 26 as shown in FIG. 1 where the fluid in the valve 1 has a lower density than the effective density of the body 2. As the body is in its lowest position and thus closest to the second member 6, the first valve opening 18 is open for the fluid in the valve 1 to flow through.

As a fluid of higher density is flowing into the valve, the body 2 is rising in the fluid along the body support 26. The movement includes a component that moves the body 2 axially towards the first member 4 when the ring 32 is following the surface of the race ball 30.

The valve closer 22, here in the form of a ball 20A, is closing the first valve opening 18.

Figure 3:
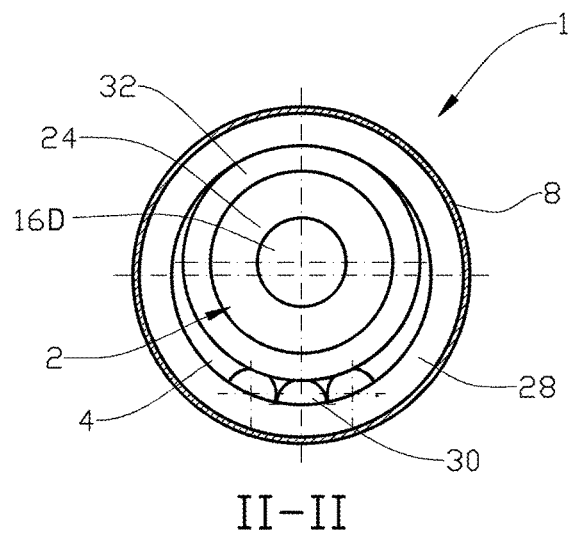
FIG. 3 shows a section II-II of the valve in FIG. 2.

In the section II-II shown in FIG. 3, the ball 20D is not shown.

Figure 2:
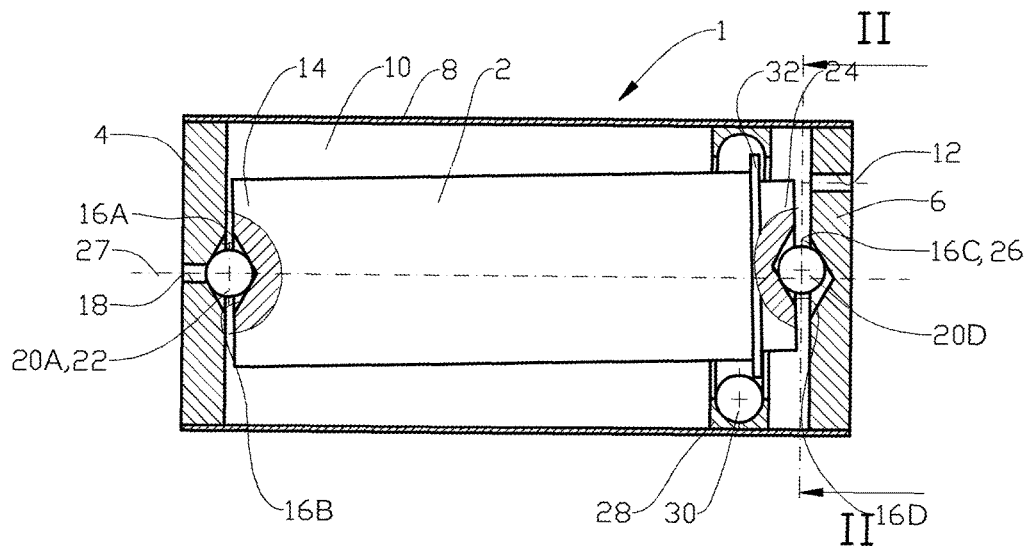
FIG. 2 shows the same as in FIG. 1, but where the valve is in its closed position.
Figure 4:
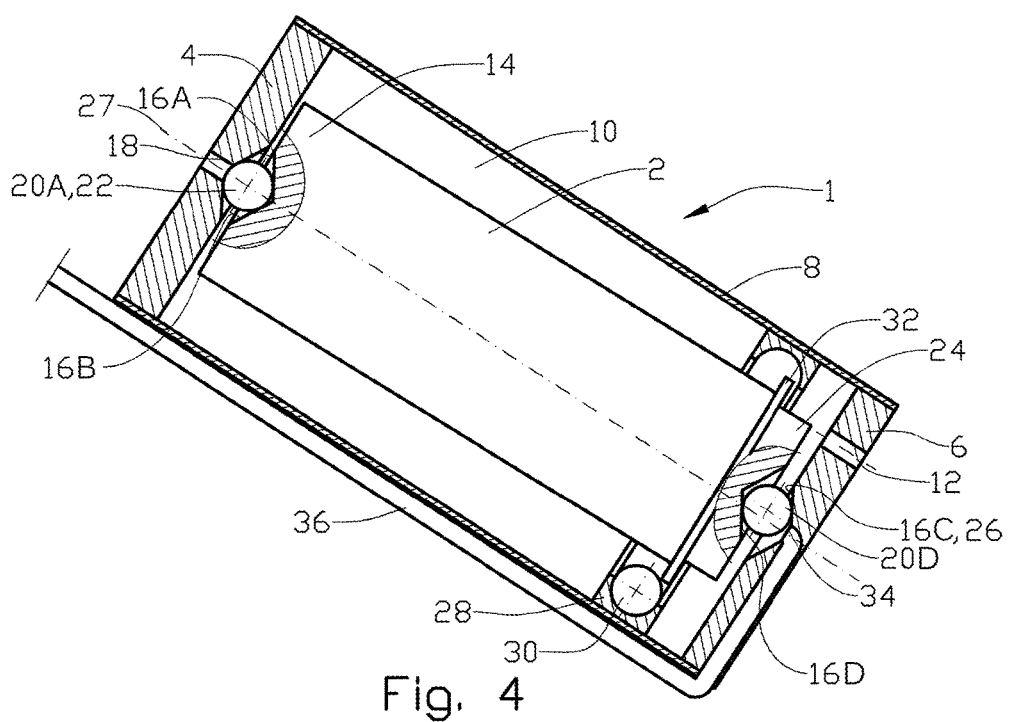
FIG. 4 shows a valve as in FIG. 2, but where a second valve opening is provided.

FIG. 4 shows an embodiment where a second valve opening 34 that extends from the conical recess 16C of the second member 6 is connected to a pipe 36. In FIG. 4 where the body 2 has the same relative position in the valve 1 as in FIG. 2, the second valve opening 34 is open while the first valve opening 18 is closed.

In FIG. 4 the valve 1 is shown in an equally functional inclined position.

Figure 5:
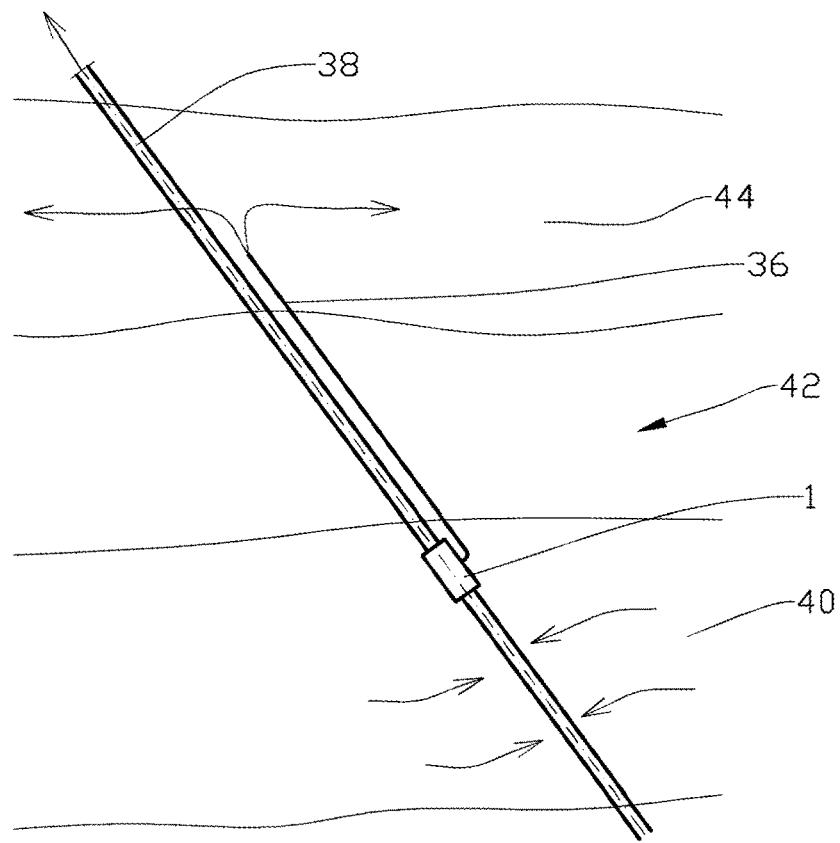
FIG. 5 shows the valve positioned in a well where water is directed into a different formation.

FIG. 5 shows a tubing string 38 that is extending into a well 40 in the ground 42. A valve 1 is included in the tubing string 38. The pipe 36 is extending from the valve 1 and into a formation 44 in the ground 42.

When the well 40 is producing water, the body 2 of the valve 1 will be in the position shown in FIG. 4. Water will thus be directed via the second valve opening 34 and the pipe 36 to the formation 44.

Figure 6:
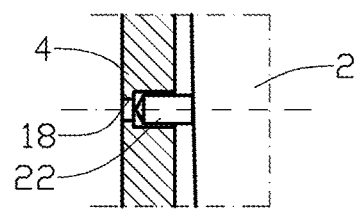
FIG. 6 shows a valve closer in an alternative embodiment.

A different valve closer 22 in the form of a seat valve is shown in FIG. 6.

Figure 7:
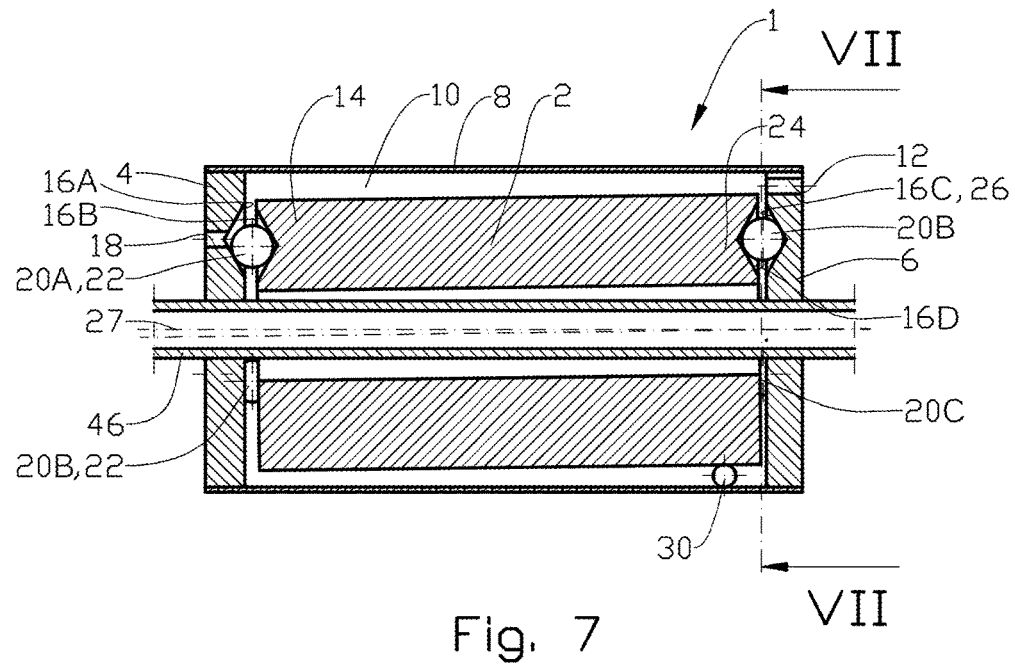
FIG. 7 shows the valve in a different embodiment in its open position.
Figure 8:
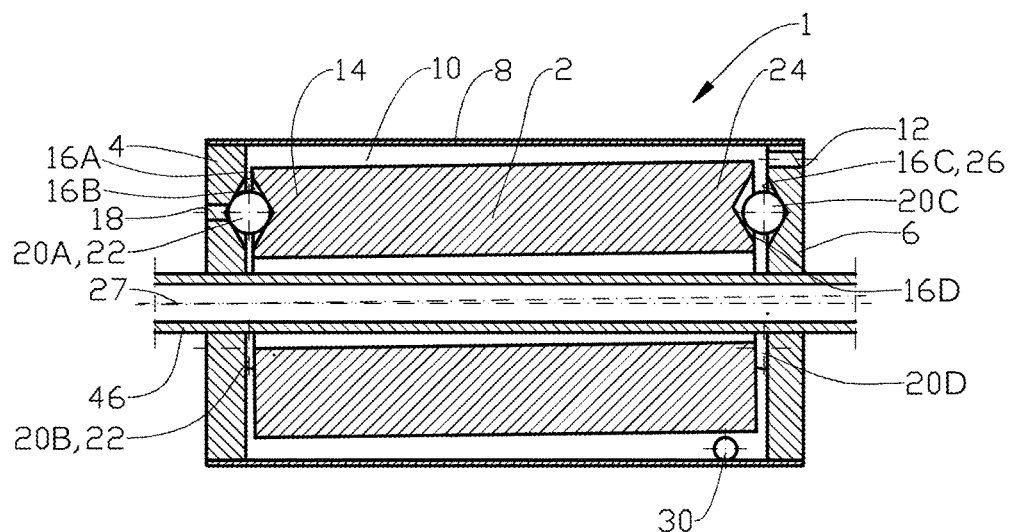
FIG. 8 shows the valve of FIG. 7 in its closed position.
Figure 9:
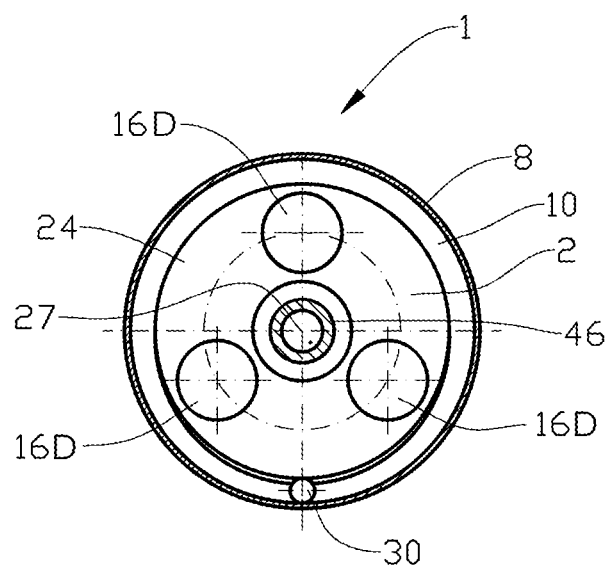
FIG. 9 shows a section VII-VII in FIG. 7.

In another embodiment shown in FIGS. 7, 8 and 9, a tube 46 is passing through the valve 1. At each end portions 14, 24 there is spaced out three balls 20A, 20B, 20C, and 20D (with the third ball at each of the end portions 14, 24 not shown) with related conical recesses 16A and 16B, 16C and 16D for increased flow capacity. The balls 20A, 20B, 20C, 20D are not shown in FIG. 9.

The invention claimed is:

1. An autonomous well valve having a body that constitutes an actuator for opening and closing at least one first valve opening, and wherein the body, that in operation is submerged, has an effective density that is equal or greater than the density of a first fluid and less than the density of a second fluid, wherein the autonomous well valve has a first member and a second member, wherein the at least one first valve opening extends from a conical recess in the first member, wherein a first end portion of the body has a corresponding conical recess, and wherein a first ball is placed between the conical recesses of the first member and the first end portion, and wherein the second member has a conical recess, wherein a second end portion of the body defines a corresponding conical recess, and wherein a second ball is placed between the conical recesses of the second member and the second end portion, wherein the body has a length that allows axial movement between the first and second members, and wherein a ball race with at least one race ball surrounds the body.

2. A device according to claim 1, wherein the conical recess in the second member extends into a second valve opening.

3. A device according to claim 1, wherein the body is biased towards the second member.

4. A device according to claim 1, wherein the body has a flange like ring that abuts the at least one ball in the ball race.

5. A device according to claim 1, wherein the autonomous well valve is symmetrical about a center axis.

* * * * *